(12) United States Patent
Königsmann

(10) Patent No.: US 10,584,204 B2
(45) Date of Patent: Mar. 10, 2020

(54) PROCESS AND DEVICE FOR PRODUCING POLYAMIDES, WITH OPTIMIZED FLOW GUIDANCE

(71) Applicants: UHDE INVENTA-FISCHER GMBH, Berlin (DE); thyssenkrupp AG, Essen (DE)

(72) Inventor: Bernd Königsmann, Langewahl (DE)

(73) Assignees: UHDE HIGH PRESSURE TECHNOLOGIES GMBH, Berlin (DE); THYSSENKRUPP AG, Essen (DE)

( * ) Notice: Subject to any disclaimer, the term of this patent is extended or adjusted under 35 U.S.C. 154(b) by 39 days.

(21) Appl. No.: 15/547,950

(22) PCT Filed: Feb. 2, 2016

(86) PCT No.: PCT/EP2016/052121
§ 371 (c)(1),
(2) Date: Aug. 1, 2017

(87) PCT Pub. No.: WO2016/124562
PCT Pub. Date: Aug. 11, 2016

(65) Prior Publication Data
US 2018/0022870 A1    Jan. 25, 2018

(30) Foreign Application Priority Data
Feb. 4, 2015 (DE) .................. 10 2015 201 969

(51) Int. Cl.
*C08G 69/16* (2006.01)
*C08G 69/48* (2006.01)
(Continued)

(52) U.S. Cl.
CPC .......... *C08G 69/16* (2013.01); *B01D 11/0253* (2013.01); *B01D 11/0284* (2013.01);
(Continued)

(58) Field of Classification Search
CPC ....................................... C08G 69/16
(Continued)

(56) References Cited

U.S. PATENT DOCUMENTS 8,541,540 B2    9/2013    Kirsten

FOREIGN PATENT DOCUMENTS

| DE | 102007057189 A | 6/2009 |
| EP | 2156933 A | 2/2010 |
| JP | 2011-504946 A | 2/2011 |

OTHER PUBLICATIONS

English translation of International Search Report issued in PCT/EP2016/052121, dated Mar. 21, 2016 (dated Mar. 31, 2016).

*Primary Examiner* — Duc Truong
(74) *Attorney, Agent, or Firm* — thyssenkrupp North America, Inc.

(57) ABSTRACT

A process for producing polyamides makes flow guidance within the process more efficient. In some respects, the process is based on the polymerization of lactam to a polyamide-containing polymer melt, the subsequent granulation of the polymer melt to polyamide granules using granulation liquid, and the subsequent extraction of monomeric and oligomeric constituents from the PA granules in an extraction column. In some examples, a temperature of the granulation liquid before being fed into an extraction liquid stream is lower than a temperature of the extraction liquid stream before the granulation liquid is fed into the extraction liquid stream. The invention relates also to a device for carrying out processes such as this one.

10 Claims, 2 Drawing Sheets

(51) Int. Cl.
*B01D 11/02* (2006.01)
*B29B 9/06* (2006.01)
*B01J 2/02* (2006.01)
*B01J 19/06* (2006.01)
*C08G 69/46* (2006.01)
*B29B 9/12* (2006.01)
*B01D 11/00* (2006.01)

(52) U.S. Cl.
CPC .................. *B01J 2/02* (2013.01); *B01J 19/06* (2013.01); *B29B 9/065* (2013.01); *C08G 69/46* (2013.01); *C08G 69/48* (2013.01); *B01D 2011/002* (2013.01); *B29B 9/12* (2013.01)

(58) Field of Classification Search
USPC .......................................................... 528/323
See application file for complete search history.

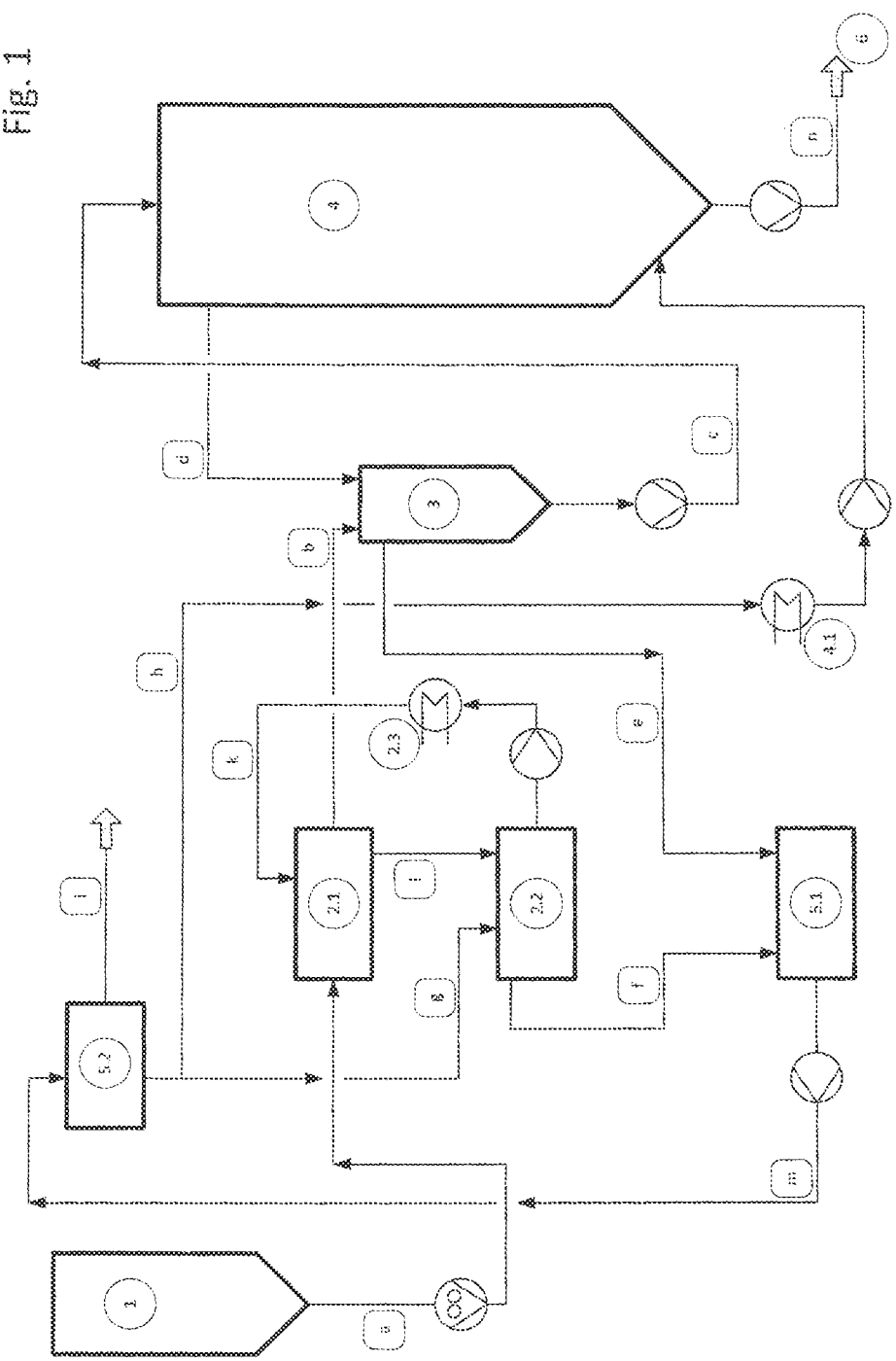

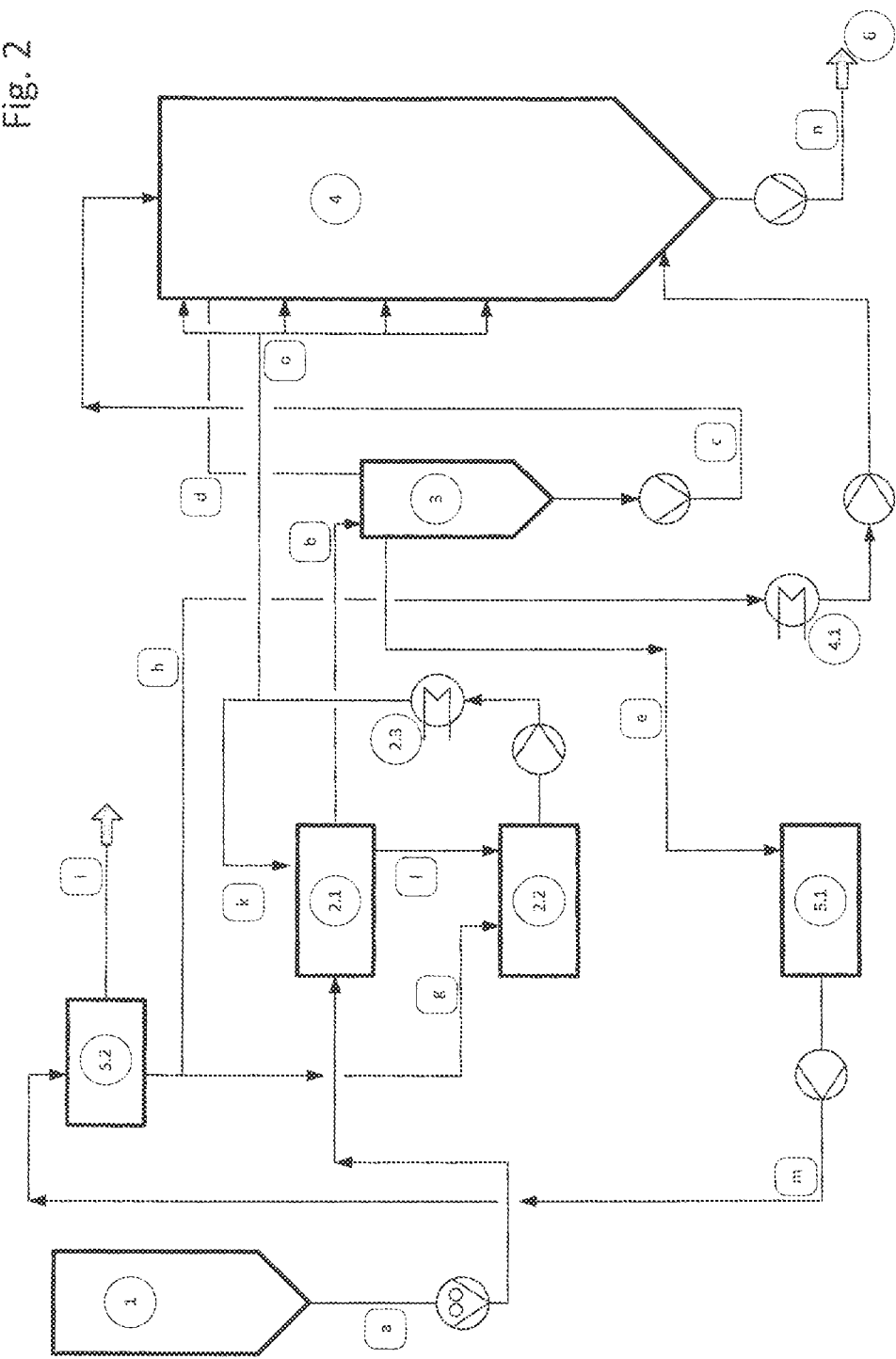

PROCESS AND DEVICE FOR PRODUCING POLYAMIDES, WITH OPTIMIZED FLOW GUIDANCE

CROSS REFERENCE TO RELATED APPLICATIONS

This application is a U.S. National Stage Entry of International Patent Application Serial Number PCT/EP2016/052121, filed Feb. 2, 2016, which claims priority to German Patent Application No. DE 10 2015 201 969.1 filed Feb. 4, 2015, the entire contents of both of which are incorporated herein by reference.

FIELD

The present disclosure generally relates to polyamides, including processes and devices for producing polyamides with optimized flow guidance.

BACKGROUND

During the production of polyamide 6 (PA6) granules by means of polycondensation from lactams, the melt obtained in the VK tube, after cooling (normally with warm water which contains small amounts of lactam), is processed to granules or chips either by strand or underwater granulation. The water required for the granulation is also referred to as cutting water. The temperature, amount and permissible concentration of lactam in the cutting water required in a particular case is governed in this case on the one hand by the granulating method used and on the other hand also by the desired appearance of the PA6 chips.

Since the granulated PA6 chips contain amounts of up to 11% lactam and oligomers, which are at least partially water-soluble, the content of lactam and oligomers in the cutting water would increase in concentration constantly in the course of the granulation, which could lead to problems with the granulation and even to failure of the granulation, for example because of increased foam formation and/or to blockage of the filters in the cutting water circuit. The elimination of such faults can take several hours in some cases and, even after the fault has been eliminated, variations in quality persist for several hours of production. These variations in quality generally have the result that, during the mentioned period of time, no granules of the desired quality can be produced or only a so-called B quality can be produced, which can be separated out and sold only at a reduced price. In order to avoid such faults, a specific stream of pure demineralized water is generally fed into the cutting water stream continuously or batchwise, in order to limit or adjust the content of dissolved lactam and oligomers. The respective permitted limits for lactam and oligomers in the cutting water vary according to the granulating method and the desired cutting water temperature. Empirical values for the content of lactam and oligomers in the cutting water are here approximately from 1.0 to 3.0% by weight for lactam and oligomers. The excess water in the cutting water circuit is removed by means of overflow control or automatic level control and fed to the lactam/water recycling system (evaporation). The set amount of demineralized water which is fed into the cutting water circuit must accordingly additionally be processed in the evaporation and thus increases the consumption of heat energy (generally heating steam). It is thus necessary, depending on the equipment present and the operational experience, to find the optimum setting point for the addition of the demineralized water after a certain time. The amounts of demineralized water are frequently set too low in order to save heating steam, but this leads sooner or later to the mentioned problems in the granulation.

The oligomers and monomers of the raw material lactam (and oligomers of the raw materials required for the production of copolymers) which remain in the melt in the polycondensation of polyamide 6 (or polyamide 6 with copolymer content<30%) must be separated off in an extraction unit arranged downstream. The content of monomers and oligomers is in most cases above 6% by weight. The separation is generally carried out by means of a one- or two-stage extraction process. The cooled polymer comminuted to granules is thereby guided countercurrently to an extraction liquid (generally water with different lactam contents). The extraction liquid thereby takes up the monomers and oligomers (extractable substances) from the polymer granules, the total content of extractable substances in the granules can be reduced to far below 1% by weight. The extraction liquid, which remains in the polymer in place of the extractable substances, must be removed in a subsequent drying step. The flow guidance is generally such that the granules in a trickle bed are guided from top to bottom through the extraction vessel, wherein the extraction liquid is guided from bottom to top. A uniform flow of granules and extraction liquid is to be ensured by means of built-in components.

On account of the different solubility of monomers and oligomers in the extraction liquid, the extraction is frequently carried out in two (or more) steps. In a first stage, the oligomers are separated off with a suitable extraction liquid, mostly water having a lactam content of from 5 to 50% by weight. In one (or more) further extraction stages, the monomers and the residual oligomers are removed from the polymer by means of a suitable extraction liquid, mostly water having a lactam content of less than 0.5% by weight.

From U.S. Pat. No. 8,541,540 B2 there is known a continuous process in which the water already used in the extraction stage is used instead of fresh water for the granulation, so that the energy consumption of the process can be reduced.

The temperature to which the extraction liquid is heated has a very great influence on the result of the extraction. Higher temperatures show better extraction results. For reasons of cost, the extraction apparatuses are mostly in the form of pressureless apparatuses. The maximum adjustable inlet temperature of the extraction liquid is accordingly the boiling temperature respectively corresponding to the hydrostatic pressure.

The extraction liquid is conventionally brought to the desired temperature once by means of internal or external heat registers, wherein the maximum adjustable temperature is the boiling temperature corresponding to the respective hydrostatic column in the extraction apparatus. This is fed in at the bottom of the extraction apparatus. However, this method does not offer the possibility of being able to adjust the extraction liquid to its respective boiling temperature over the entire length of the extraction apparatus. Especially when a multi-stage extraction must be used in order to achieve the required residual extract content of significantly less than 1.0% by weight, the inlet temperature of the pre-extracted granules is close to the boiling temperature of the extraction liquid. The transport liquid is separated off at the top of the extraction reactor. Owing to the high temperature of the granules, the extraction liquid is scarcely cooled in the extraction column. For this reason, additional cooling of the extraction liquid is necessary.

Therefore, a need exists for a process for producing polyamides in which additional cooling of the extraction liquid can be avoided and an economical process is thus permitted.

BRIEF DESCRIPTION OF THE FIGURES

FIG. 1 is a schematic view of a process according to the prior art.

FIG. 2 is a schematic view of a process according to the invention.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to processes for producing polyamides, wherein the flow guidance in the process is made more efficient. In one example, the process is based on the polymerization of lactam to a polyamide-containing polymer melt, the subsequent granulation of the polymer melt to polyamide granules using granulation liquid, and the subsequent extraction of monomeric and oligomeric constituents from the PA granules in an extraction column. The present disclosure further relates to devices for carrying out such processes.

According to the invention there is provided a process for producing polyamides with optimized flow guidance, which process comprises the following steps:
a) polymerizing lactam to a polyamide-containing polymer melt,
b) granulating the polymer melt to polyamide granules using granulation liquid,
c) extracting monomeric and oligomeric constituents from the PA granules in an extraction column, wherein the PA granules are guided countercurrently to an extraction liquid stream.

In the process, at least a portion of the granulation liquid is fed into the extraction liquid stream at at least one infeed point of the extraction column in order to adjust the temperature and lactam concentration of the extraction liquid stream.

By the purposive addition according to the invention of the granulation liquid at at least one infeed point of the extraction column, the temperature of addition of the extraction liquid stream can be significantly above the atmospheric boiling temperature. The extraction efficiency is increased significantly as a result. A further increase in the extraction efficiency is achieved by lowering the concentration in the upper portion of the extraction column by adding the granulation liquid, which has a lower lactam content as compared with the prior art. As a result, the driving concentration gradient between granules and granulation liquid is increased in the upper portion of the extraction column. By combining these two effects, the volume efficiency of the extraction column can be increased significantly. The volume of the extraction column can thus be reduced, or the extraction capacity can be increased with the same volume.

It is preferred according to the invention that the temperature of the granulation liquid before it is fed into the extraction liquid stream is lower than the temperature of the extraction liquid stream before the granulation liquid is fed in, wherein the temperature of the granulation liquid before it is fed into the extraction liquid stream is preferably from 10° C. to 50° C., particularly preferably from 15° C. to 40° C., most particularly preferably from 20° C. to 30° C.

In a further preferred embodiment, it is provided that the content of lactam and oligomeric constituents in the granulation liquid before it is fed into the extraction liquid stream is lower than the content of lactam and/or oligomeric constituents in the extraction liquid stream before the granulation liquid is fed in, wherein the content of lactam and/or oligomeric constituents in the granulation liquid before it is fed into the extraction liquid stream is preferably from 0.1% by weight to 5.0% by weight, particularly preferably from 0.5% by weight to 4.0% by weight, most particularly preferably from 1.0% by weight to 3.0% by weight.

The number of infeed points for the granulation liquid is in principle not limited, but according to the present disclosure the granulation liquid is fed into the extraction liquid stream in order to adjust the temperature and lactam concentration of the extraction liquid stream at from 1 to 10 infeed points of the extraction column, preferably at from 1 to 4 infeed points of the extraction column, which infeed points are situated at different heights of the extraction column.

The amount of granulation liquid fed in is preferably measured and adjusted here by means of suitable devices. The amount of granulation liquid is generally adjusted by means of automatic flowmeters in combination with control valves, which are adjusted by an automatic control system. Alternatively, manual adjustment (hand valve with or without local flow measurement) of the granulation liquid stream is possible.

It is further preferred that the granulation liquid contains lactam and/or oligomeric constituents and is provided by means of a granulation liquid circuit, wherein pure demineralized water is fed into the granulation liquid circuit continuously or batchwise and wherein the content of lactam and/or oligomeric constituents in the granulation liquid is preferably measured by means of a suitable measuring device, and the amount of pure demineralized water fed in is adjusted on the basis of the measured values so determined, in order thus to keep the content of lactam and oligomeric constituents in the granulation liquid within a specific range.

In a further preferred embodiment, it is provided that a step of pre-extraction in a pre-extraction column is carried out between the step of granulation and the step of extraction, wherein the extraction liquid stream, after the extraction has been carried out, is preferably discharged from the extraction column and then fed to the pre-extraction vessel and there guided countercurrently to the PA granules.

It is further preferred that the extraction liquid stream, after the extraction has been carried out or, if pre-extraction is carried out, after the pre-extraction has been carried out, is discharged from the extraction column or, if pre-extraction is carried out, from the pre-extraction column and fed to a collecting tank for evaporation, wherein no additional granulation liquid from a different source is fed to the collecting tank for evaporation.

According to the invention there is also provided a device for producing polyamides with optimized flow guidance, which device comprises a polymerization system, a granulation system, and an extraction column having at least one inlet at the top suitable for PA granules, at least one outlet at the bottom suitable for PA granules, at least one inlet at the bottom suitable for extraction liquid, at least one outlet at the top suitable for extraction liquid, and at least one infeed point suitable for granulation liquid.

The granulation system and the at least one infeed point are thereby connected to one another via a line through which a portion of the granulation liquid used in the granulation system can be transferred to the at least one infeed point.

In the device according to the invention, it is preferred that it comprises a collecting tank for evaporation, wherein the collecting tank for evaporation is connected to the extraction vessel or if present, to the pre-extraction vessel, in such a manner that an extraction liquid stream discharged from the extraction vessel or the pre-extraction vessel can be fed to the collecting tank for evaporation, and wherein the collecting tank for evaporation is not connected to the granulation system in such a manner that the granulation liquid can be fed directly to the collecting tank for evaporation.

The granulation system is preferably connected to a granulation liquid circuit which preferably comprises a granulation liquid tank, particularly preferably a granulation liquid tank with an overflow valve.

According to the present disclosure, the extraction column may in some examples have from 1 to 10, preferably from 1 to 4, infeed points for the granulation liquid, wherein the plurality of infeed points are arranged at different heights of the extraction column.

It is further preferred that the device has a pre-extraction vessel.

By means of the process according to the invention there are produced polymer granules which have a low content of low molecular weight constituents. To that end, the polymer melt produced from the starting materials must be solidified for further processing and divided into cylindrical or spherical particles (granules). For this purpose, the melt (a), which is conveyed from the polymerization reactor (1) by means of a pump, is guided to the granulation stage (2.1). The polymer melt is there solidified by a cooled cutting water stream (k) and divided into uniform particles (granules) by a rotating cutting tool. The cutting water stream (k) is held available in the cutting water tank (2.2), is conveyed by means of a pump, via the cooler (2.3), into the granulation stage (2.1), and flows back (stream I) into the cutting water tank (2.2) again at a higher temperature. In order to keep the concentration of the cutting water (k) constant, a makeup stream (g) is passed continuously into the cutting water tank (2.2). This makeup stream is taken from the condensate stream of the evaporator system (5.2). The supply of the makeup water (g) results in a discharge from the cutting water circuit (f), which is guided back into the evaporation system (5.2) again via the collecting tank of the evaporation system (5.1), in order to remove impurities therein.

The stream of granules (b) from the granulation stage (2.1) is guided into the pre-extraction stage (3). Monomers and low molecular weight constituents of the polymer are there washed out by means of a pre-extraction liquid. The pre-extraction liquid consists for the most part of the discharge of extraction liquid (d) from the main extractor (4), which is guided into the pre-extraction stage (d). The discharge stream of pre-extraction liquid loaded with low molecular weight constituents is fed to the collecting tank of the evaporation system (5.1) (stream e). Granules, which have largely been freed of low molecular weight substances, are guided from the pre-extraction stage (3) into the main extraction stage (4) (stream c). The polymer is there further freed of monomers and low molecular weight constituents by contact with an extraction liquid. The monomers and low molecular weight constituents are transferred to the extraction liquid and are guided in the discharge stream (d) to the pre-extraction stage. The extraction liquid having a low content of low molecular weight constituents that is conveyed to the main extraction stage (stream h) is taken from the condensate stream from the evaporation system (5.2). The extraction liquid is conveyed by means of a pump, adjusted in terms of temperature by a heater (4.1) and fed to the main extractor.

The polymer granules sufficiently freed of low molecular weight constituents are removed at the bottom end of the main extractor (stream n) and fed to the following treatment stage (6). In the evaporation stage (5.2), the low molecular weight constituents are removed from the various feed streams of the collecting tank (5.1). They are concentrated and discharged for further use (stream i). The liquid having a low content of low molecular weight constituents that remains is fed, as described above, to the extraction stages and the granulation unit.

In a departure from the process described in FIG. 1, the discharge from the cutting water container is not conveyed directly to the collecting tank of the evaporation system (5.1). The excess cutting water from the granulation stage (2.1) is taken from the cutting water stream (k) downstream of the cooler (2.3) and conveyed to the main extractor (4) (stream o). The cutting water stream (o) can be introduced into the main extractor (4) at different heights, as required by the process, where it mixes with the extraction liquid. As a result, the temperature and the concentration of the extraction liquid in the main extractor are positively influenced. The mass stream (o) metered in flows with the extraction liquid via the pre-extraction stage (3) to the collecting tank of the evaporation system (5.1).

Example

The boundary conditions for an embodiment of the process according to the invention are given below. They represent the settings on start-up:

Cutting water temperature outflow, $t_1$: 20° C.
Cutting water temperature return flow, $t_2$ 30° C.
Discharged cutting water stream, ms: 1900 kg/h
Lactam concentration in the cutting water, $c_s$: 1-10% by weight
Maximum temperature in the extractor (pressureless), $t_3$: 100° C. (hydrostatic pressure disregarded)
Mean specific heat capacity cutting water, $c_p$: 4.18 kJ/(kg*K)
Inlet temperature of the water/granule mixture from pre-extraction, $t_4$: 98° C.
Incoming amount of water from the pre-extraction: 19 500 kg/h
Incoming amount of DEMI water at the extraction apparatus, $\dot{m}_E$: 4000 kg/h
Lactam outlet concentration of the 6-10% by weight; extraction liquid, $x_c$: 8%

Determination of the Amount of Cutting Water to be Discharged

The amount of cutting water to be discharged corresponds to approximately from 1 to 10% of the total amount of cutting water circulating in a particular case and is additionally also dependent on the granulation system installed in a particular case, the cutting water temperature and on the in a particular case dwell time of the granules in the water. Variations in the operating procedure caused by different capacities, especially in the case of a plurality of granulation lines with a common cutting water tank, rapidly lead to variations in the concentration in the cutting water tank, since the latter does not generally have a large buffer volume.

This problem can be eliminated permanently by constant measurement of the lactam concentration in the cutting water stream with automatic control for the infeed of DEMI water to control the desired lactam content in the cutting water.

Determination of the Cooling Efficiency According to Boundary Conditions

This cooling efficiency present can be used to set the optimum extraction temperature, that is to say the probability of the extraction liquid boiling at the liquid surface of the extraction apparatus can be reduced.

$$Q = \dot{m}_s * c_p * \text{delta}(t_2 - t_3) \quad \text{General}$$

$$Q = 1900 \text{ kg}/(3600 \text{ s}) * 4.18 \text{ kJ}/(\text{kg*K}) * (30-100)\text{K}$$

$$Q = 154.4 \text{ kW} \quad \text{Example}$$

Determination of the Reduction in Concentration at the Top of the Extraction Apparatus The DEMI water coming from the bottom and the granules coming from the top flow past one another countercurrently in the extraction apparatus, the extraction liquid thereby becomes enriched with lactam along its path. The extraction liquid leaves the extraction apparatus with the lactam concentration $x_c$.

$$\text{General: } c_g = (\dot{m}_E * x_c + \dot{m}_s * c_s) / \dot{m}_g$$

$$\text{Example: } c_g = (4000 \text{ kg/h} * 0.08 + 1900 \text{ kg/h} * 0.02)/5900 \text{ kg/h}$$

$$= 0.06$$

What is claimed is:

1. A process for producing polyamides with optimized flow guidance, the process comprising:
   polymerizing lactam to a polyamide-containing polymer melt;
   granulating the polyamide-containing polymer melt to PA granules using granulation liquid;
   extracting monomeric and oligomeric constituents from the PA granules in an extraction column, wherein the PA granules are guided countercurrently to an extraction liquid stream; and
   feeding at least a portion of the granulation liquid into the extraction liquid stream at at least one infeed point of the extraction column to adjust a temperature and a lactam concentration of the extraction liquid stream, wherein the at least one infeed point comprises ten infeed points at most, wherein if the at least one infeed point comprises more than one infeed point the infeed points are disposed at different heights of the extraction column,
   wherein a content of lactam and oligomeric constituents in the granulation liquid before the granulation liquid is fed into the extraction liquid stream is lower than a content of at least one of lactam or oligomeric constituents in the extraction liquid stream before the granulation liquid is fed in, wherein the content of the at least one of the lactam or oligomeric constituents in the granulation liquid before the granulation liquid is fed into the extraction liquid stream is from 0.1% by weight to 5.0% by weight.

2. The process of claim 1 wherein a temperature of the granulation liquid before being fed into the extraction liquid stream is lower than the temperature of the extraction liquid stream before the granulation liquid is fed in.

3. The process of claim 2 wherein the temperature of the granulation liquid before being fed into the extraction liquid stream is from 10° C. to 50° C.

4. The process of claim 2 wherein the temperature of the granulation liquid before being fed into the extraction liquid stream is from 15° C. to 40° C.

5. The process of claim 1 wherein the at least one infeed point of the extraction column comprises between one and four infeed points.

6. The process of claim 1 further comprising measuring and adjusting an amount of granulation liquid fed into the extraction liquid stream.

7. The process of claim 1 wherein the granulation liquid contains at least one of lactam or oligomeric constituents, the process further comprising:
   providing the granulation liquid by way of a granulation liquid circuit;
   feeding demineralized water into the granulation liquid circuit;
   measuring a content of the at least one of lactam or oligomeric constituents in the granulation liquid; and
   adjusting an amount of the demineralized water fed into the granulation liquid circuit based on the measured content of the at least one of lactam or oligomeric constituents in the granulation liquid so as to keep the content of the at least one of lactam or oligomeric constituents in the granulation liquid within a range.

8. The process of claim 1 further comprising pre-extracting in a pre-extraction column after the granulating and before the extracting, wherein after the extracting the extraction liquid stream is discharged from the extraction column and fed to the pre-extraction column and guided countercurrently to the PA granules.

9. The process of claim 1 further comprising discharging the extraction liquid stream from the extraction column after the extraction.

10. The process of claim 9 wherein no additional granulation liquid from another source is fed to a collecting tank for evaporation.

* * * * *